(No Model.)

R. H. HILL.
FRICTION COUPLING DEVICE.

No. 316,149. Patented Apr. 21, 1885.

Witnesses:
J. W. Dean
Herman Koegel

Inventor:
Richard H. Hill

UNITED STATES PATENT OFFICE.

RICHARD H. HILL, OF HOLYOKE, MASSACHUSETTS.

FRICTION COUPLING DEVICE.

SPECIFICATION forming part of Letters Patent No. 316,149, dated April 21, 1885.

Application filed January 4, 1884. (No model.)

*To all whom it may concern:*

Be it known that I, RICHARD H. HILL, of the city of Holyoke, county of Hampden, State of Massachusetts, have invented a new Improved Friction Coupling Device for the Transmission of Power, of which the following is a description.

The purpose of this invention is to connect and disconnect motive powers—viz., engines and water-wheels, &c.—also to stop and start any machinery with an easy even motion.

It consists of the ordinary loose pulley, the inner face of the rim being the friction-surface of the pulley. The aforesaid pulley is combined with a carrier mounted securely upon the shaft, said carrier consisting of a hub having arms upon which are rigidly fastened segments of a ring provided with friction-surfaces that fit the friction-surfaces of the pulley. The friction is produced by forcing the segments of the ring out against the friction-surface of the pulley by means of knuckle-jointed levers operated by a movable clutch-collar. The fact of the segments of the carrier-ring being rigidly fastened to the arms of said carrier limits their movement to and from the friction-surface of the pulley to the elasticity of the metal of which the segments are made, and the natural tendency to contract to the original position when pressure is removed clears the friction-surfaces.

Figure 1:
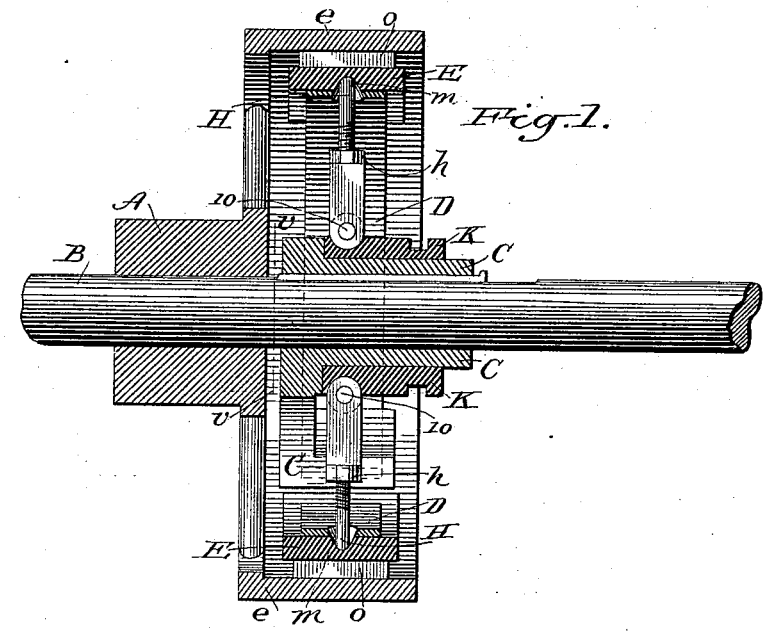
Figure 2:
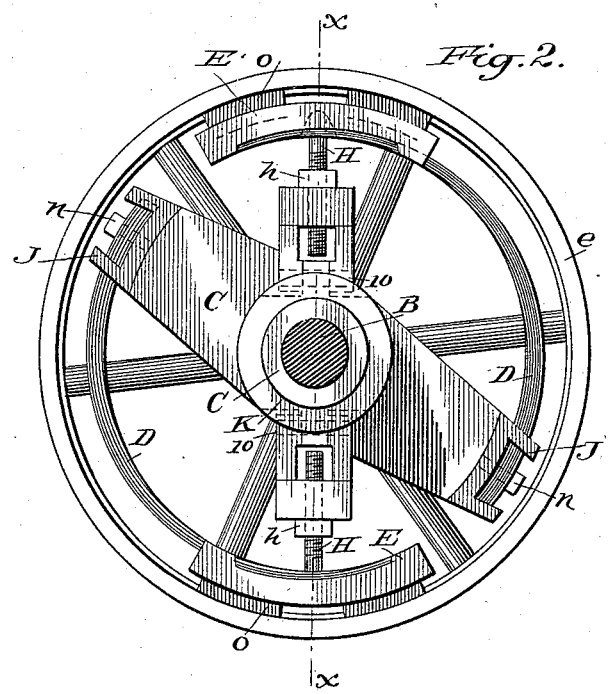

Figure 1 is a longitudinal section through Fig. 2 on the line $x\ x$. Fig. 2 is an end view of Fig. 1 from the right.

Similar letters of reference indicate corresponding parts.

A is a pulley revolving loose upon the shaft B, except when clutched.

C is the carrier or rigid part of the friction device, which is fastened by keys or otherwise to the shaft B. The carrier C consists of a hub having arms upon which are rigidly fastened between projections J J on said arms, by the screws $n\ n$, the segments of a ring, D D.

E E are the friction-shoes of the carrier, which may be shod with wood, leather, or any other desirable material, as at $o$, and are secured to the outer end of the segment D.

The friction-pads $o$, secured within the shoes of the carrier C, are put in contact with the friction-surfaces of the pulley A by means of the knuckle-jointed levers H H, operated by the movable clutch-collar K. One end of the levers H H fits in the sockets $m\ m$ within the under side of the shoes, and the other end is pivoted to the sliding clutch-collar K by the pivots 10 10. By moving the sliding clutch-collar K toward the pulley A, which may be done by a shipper-lever fitting in the groove of the movable clutch-collar K, the levers H H assume a position perpendicular to the shaft, whereby pressure is exerted sufficient to spring the segments of the ring D D of the carrier C out against the friction-surface of the pulley A so that pulley is clutched and made to revolve with the carrier. The movement of the clutch-collar K in an opposite direction relieves the pressure applied to the segments of the ring D D of the carrier C, and the elasticity of the metal of which aforesaid segments D D are constructed allows them to spring back to their original position. The levers H H are so made that they can be lengthened or shortened, so that friction-surfaces may be adjusted when worn. When set, they are held by check-nuts $h\ h$. By keying the pulley A to the shaft B and cutting shaft on the line $v\ v$ we have a cut-off friction-coupling.

I do not limit myself to two arms and two segments of ring D D in constructing carrier, but employ any number that size of clutch may require.

What I consider new, and desire to claim by Letters Patent, is as follows:

1. The combination of the pulley A with the carrier C, consisting of a hub having arms upon which are rigidly fastened at one end segments of a ring, D D, provided with movable shoes E E, having friction-pads fitting the friction-surface of the pulley A, all substantially for the purpose as set forth.

2. The carrier C, consisting of a hub having arms upon which are rigidly fastened at one end segments of the ring D D, having movable friction-shoes E E, fitting the friction-surface of the pulley A, substantially for the purpose as set forth.

RICHARD H. HILL.

Witnesses:
 C. M. PORTER,
 F. P. GOODALL.